United States Patent [19]

Dietrich, Sr.

[11] Patent Number: 4,535,849

[45] Date of Patent: Aug. 20, 1985

[54] IMPLEMENT WITH HORIZONTAL LINKAGE DEPTH CONTROL

[75] Inventor: William J. Dietrich, Sr., Congerville, Ill.

[73] Assignee: DMI, Inc., Goodfield, Ill.

[21] Appl. No.: 532,678

[22] Filed: Sep. 16, 1983

[51] Int. Cl.³ ............................................... A01B 13/08
[52] U.S. Cl. .................................... 172/468; 172/484; 172/166
[58] Field of Search ............... 172/484, 140, 178, 177, 172/179, 180, 146, 148, 181, 771, 147, 149, 770, 145, 150, 454, 483, 497, 583, 166, 504, 197, 316, 78, 468, 469, 470, 471, 785, 142

[56] References Cited

U.S. PATENT DOCUMENTS

| | | | |
|---|---|---|---|
| 1,557,109 | 10/1925 | Vandenberg | 172/603 |
| 2,701,509 | 2/1955 | Rolfes | 172/316 |
| 3,209,841 | 10/1965 | Lely | 172/484 |
| 3,576,213 | 3/1969 | Hall | 172/484 |
| 3,744,571 | 7/1973 | Nichols | 172/484 |
| 4,191,262 | 3/1980 | Sylvester | 172/484 |
| 4,245,706 | 1/1981 | Dietrich | 172/180 |
| 4,250,970 | 2/1981 | Pfenninger | 172/142 |
| 4,313,503 | 2/1982 | Good | 172/178 |
| 4,433,735 | 2/1984 | Clark | 172/484 |

FOREIGN PATENT DOCUMENTS 781183  3/1968  Canada ............................ 172/484

Primary Examiner—Richard J. Johnson
Attorney, Agent, or Firm—Emrich & Dithmar

[57] ABSTRACT

An agricultural tillage implement has a main frame provided with support wheels and carrying the first set of ground working tools. A first lift mechanism raises and lowers the main frame relative to the support wheels. A sub-frame, carrying a second set of ground working tools, is adjusted in height relative to the main frame by means of a second lift mechanism comprising a single rock shaft and four-bar linkage. Vertical frame extensions on the main frame and the sub-frame provide parallel links in the four-bar linkage to permit greater angular adjustment of the rock shaft and, hence, greater vertical adjustment of the sub-frame for a single rock shaft actuator.

11 Claims, 3 Drawing Figures

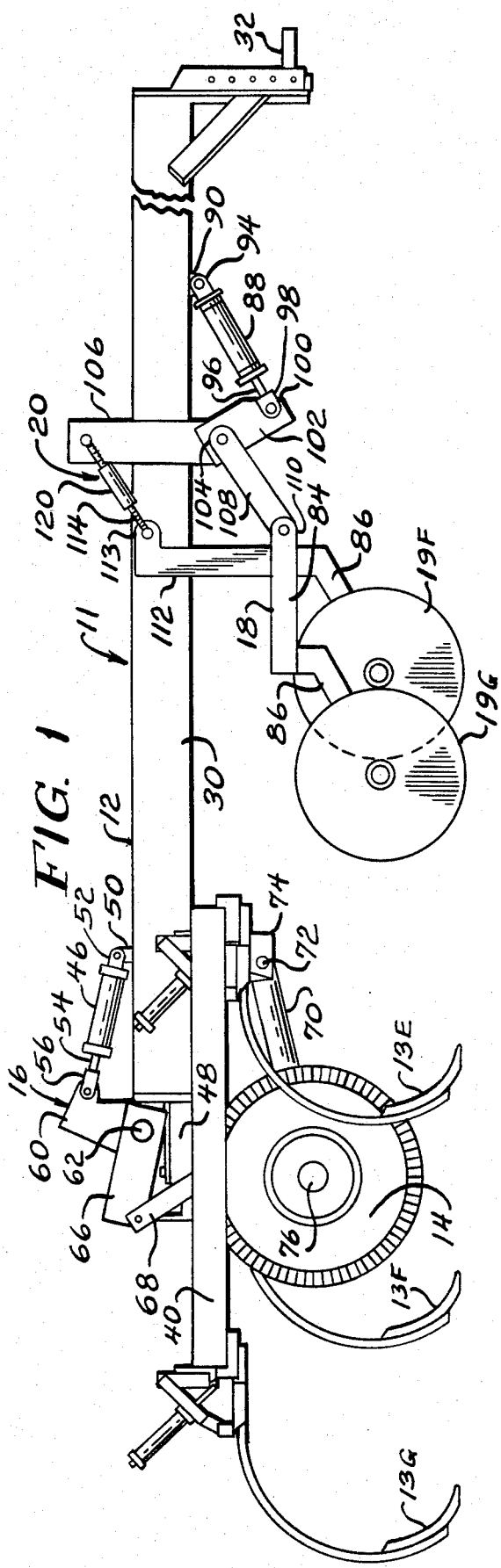

IMPLEMENT WITH HORIZONTAL LINKAGE DEPTH CONTROL

BACKGROUND OF THE INVENTION

The present invention relates to an agricultural tillage apparatus; and more particularly, it relates to a tillage apparatus providing independent depth adjustment of two sets of ground working tools carried upon a main frame and sub-frame respectively.

Efficient farming requires a limited number of passes over the farm land in order to reduce man hours on the field and maximize the work done with a given amount of fuel. In order to combine various operations within one-pass over the field, differing types of ground working tools have been mounted on an implement for simultaneous use as the implement travels over the field. For example, two operations, cutting and burying trash, can be performed simultaneously by mounting coulter disks, which cut trash, to the front of an implement followed by chisel plows, which bury trash, mounted to the rear. Ideally, a farm implement would be able to accommodate the physical differences in size and shape between at least two sets of ground working tools and the differing operating demands of each set of tools as dictated by environmental factors. Independent depth control allows differing tools to be used simultaneously and effectively on the same implement.

My U.S. Pat. No. 4,245,706 for a One-Pass Complete Tillage System issued Jan. 20, 1981, discloses an adjustment mechanism for independently setting the depth of ground-working tools mounted on an implement frame. That adjustment mechanism includes two separate rock shafts, a forward one and and a rear one, each having its own bearings and journals to permit it to rotate a four-bar linkage which connects the sub-frame to the main frame for adjusting the sub-frame vertically relative to the main frame while maintaining the sub-frame parallel to the main frame. The four bar linkage includes an actuator arm pivotally connected to the rod end of a hydraulic cylinder at one end. The other end of the actuator arm is attached to a first or forward rock shaft which is rotatably mounted to the main frame. Forward links are welded to each end of the forward rock shaft for rotation therewith with one end pivotally connected to a sub-frame. A parallel linkage, also controlled by the actuator arm and the forward rock shaft, extends rearwardly to operate a crank mounted to a second or rear rock shaft. Rear links affixed to the rear rock shaft mirror the movement to lift the rear of the sub-frame. A turnbuckle is incorporated in the parallel linkage to make minor adjustments in the operating depth of the front and rear sets of the disk blades carried on the sub-frame and to provide adjustment for wear.

The system disclosed in my earlier patent is capable of great vertical adjustment because the two rock shafts and connecting turnbuckle cooperate to eliminate problems of lock-up or jamming of the pivoting link mechanism by applying rotational forces symmetrically above and below the link means. Thus, that system includes a driven rock shaft which is capable of rotation of 150 or more. However, that system is also expensive to manufacture because of the cost involved in the second rock shaft and its associated bearings and journals.

SUMMARY OF THE INVENTION

The present invention is directed to a tillage apparatus which permits independent depth adjustment for two sets of ground working tools carried upon a main frame and a sub-frame respectively. The present invention is simple in construction and is adaptable to a variety of tool combinations such as coulter blades followed by chisel shanks, disk blades followed by cultivator sweeps, cultivator sweeps followed by anhydrous ammonia knives.

Briefly, the present invention includes an agricultural tillage implement, adapted to be pulled by a vehicle such as a tractor. The implement includes a main frame equipped with support wheels and carrying a first set of ground working tools. A first lift mechanism is coupled between the wheels and the main frame for raising and lowering the main frame by means of a first double-acting hydraulic cylinder. A sub-frame, carrying a second set of ground working tools, is supported by the main frame. A second lift mechanism allows the working depth of tools on the sub-frame to be adjusted relative to the first ground working tools on the main frame. The second lift mechanism includes a single rock shaft rotatably mounted to the main frame to actuate a four-bar linkage to raise and lower the sub-frame while maintaining it parallel to the main frame. A second double-acting hydraulic cylinder is coupled to the rock shaft by means of a crank arm for rotating the rock shaft in either direction. Shaft arms are rigidly affixed to opposite ends of the rock shaft for rotation therewith and they are also pivotally coupled to the sub-frame for raising and lowering it. Vertical extensions on the main frame and sub-frame provide one set of parallel links in the four-bar linkage. Links pivotally mounted at one end to the main frame and at the other end to the sub-frame cooperate with the shaft arms to provide the other set of parallel links in the four-bar linkage. Rotation of the rock shaft and movement of the shaft arms raises and lowers the sub-frame while maintaining it generally parallel to the main frame and horizontal.

The present invention provides a sub-frame lift mechanism utilizing only one rock shaft which is nevertheless capable of moving the sub-frame over a wide angular displacement of the rock shaft without problems of "over center" trapping of the lift mechanism linkage. Thus, the present invention is able to accommodate the differences in size and function of two sets of ground working tools and to adjust to various operating conditions.

Other features and advantages of the present invention will be apparent to persons skilled in the art from the following detailed description of the preferred embodiments, accompanied by the attached drawing wherein identical reference numbers will refer to like parts in the various views.

THE DRAWINGS

FIG. 1 is a side view of a farm implement embodying features of the present invention including a sub-frame in a lowered or use position;

FIG. 2 is a view similar to FIG. 1 but with the sub-frame and its tools raised; and, FIG. 3 is a plan view of the farm implement depicted in FIGS. 1 and 2.

DETAILED DESCRIPTION

Figure 3:
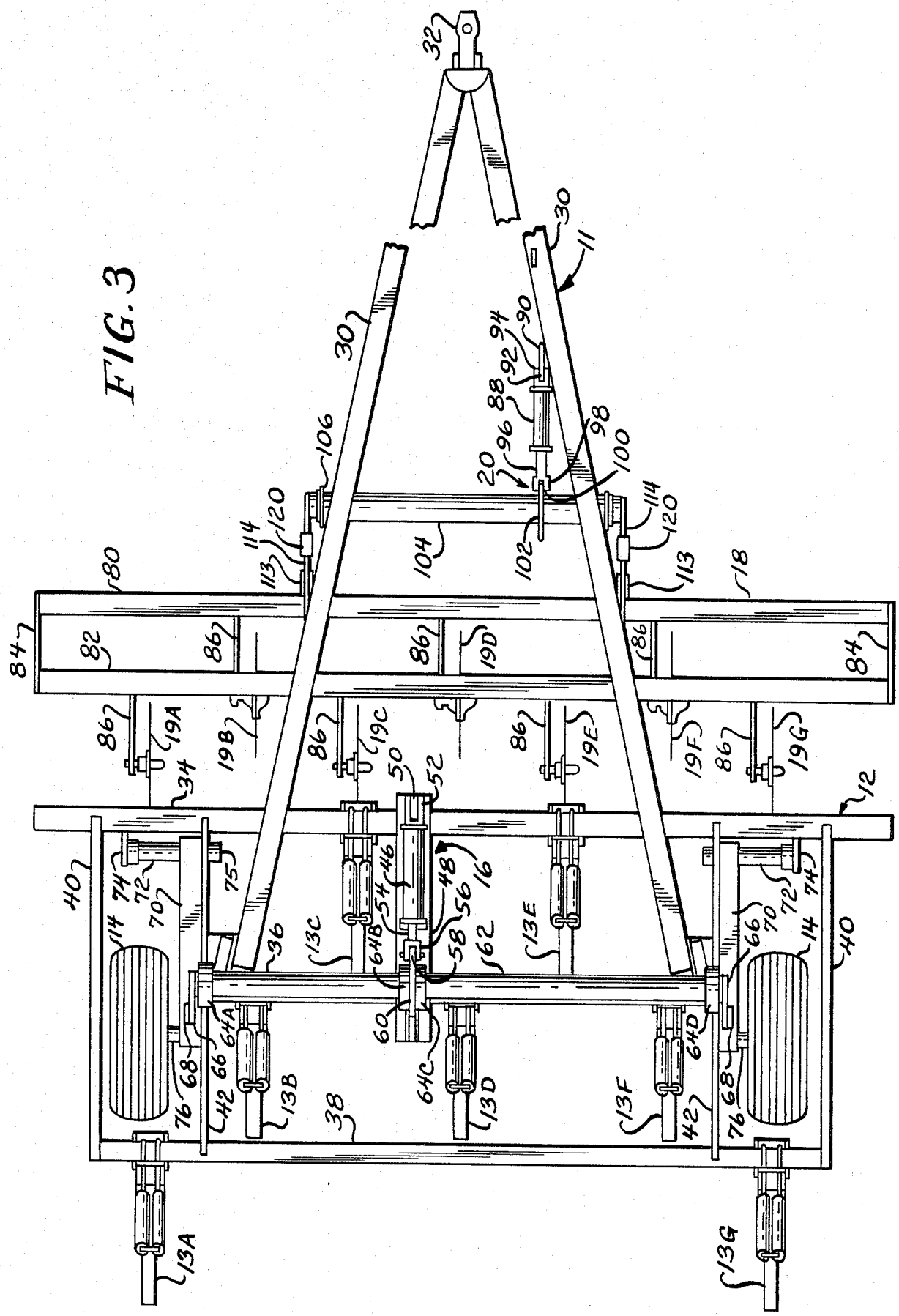

The agricultural tillage implement of the present invention, providing separate depth adjustment of ground working tools carried upon a main frame and a sub-frame, is susceptible of embodiments in many different forms and may be adapted for many different applications. The invention will be described in detail as an agricultural tillage implement with a forward sub-frame carrying disks and a main frame carrying chisel shanks behind the disks with the understanding that the present invention is to be considered an exemplification of the principles of the invention and is not intended to limit the invention to the embodiments illustrated. For example, the present invention would have application to a variety of ground working tool combinations such as disk blades and cultivator sweeps, or cultivator sweeps and anhydrous ammonia knives.

Referring first to FIG. 1, an agricultural tillage implement generally designated by numeral 11, embodying the principles of the subject invention, includes a main frame 12 carrying a set of ground working tools such as chisel plows designated respectively 13A–13G toward the rear is supported by wheels 14. A main frame lift mechanism 16 is coupled to the wheels 14 and main frame 12 for raising and lowering the main frame 12. A sub-frame 18 carrying a second set of ground working tools such as disks 19A–19G is coupled to the main frame by a sub-frame lift mechanism 20. Sub-frame lift mechanism 20 allows the adjustment of the working depth of the second set of ground working tools 19A–19G carried upon the sub-frame 18 relative to the first set of ground working tools 13 carried upon the main frame 12.

Referring now to FIG. 3, the main frame 12 includes tubular frame members 30 extending outwardly and rearwardly in a chevron shape. A hitch 32 attaches the implement 11 to a vehicle such as a tractor (not shown). Forward horizontal member 34 and middle horizontal member 36 extend laterally across the main frame members 30. A rear horizontal member 38 extends parallel to forward and middle horizontal members 34 and 36 and is rigidly supported by two outer braces 40 extending from forward member 34 to rear member 38, and two inner braces 42 joining forward member 34, middle member 36 and rear member 38, to affix rear horizontal member 38, to chevron-shaped members 30 and to provide rigidity to the main frame structure.

The main frame 12 is carried upon wheels 14 coupled to the main frame 12 by the lift mechanism 16. The lift mechanism 16 includes a double-acting hydraulic cylinder 46 which is mounted to the main frame by means of a support brace 48 having an upward projecting tongue 50 for receiving a slotted groove 52 affixed to the hydraulic cylinder 46. The support brace 48 extends from forward horizontal member 34 beyond middle horizontal member 36 to provide a rigid foundation for the hydraulic cylinder 46. The hydraulic cylinder 46 has a hydraulic cylinder rod 54 equipped with a slotted groove 56 adapted to receive an interfitting tongue 58 of a crank arm 60.

Crank arm 60 is affixed to a main frame rock shaft 62 which extends laterally across chevron members 30 and beyond inner braces 42. Main frame rock shaft 62 is rotatably affixed to the main frame 12 by means of pillow blocks 64A–64D. Movement of the hydraulic cylinder rod 54 causes a corresponding movement of crank arm 58 rotating main frame rock shaft 62 within pillow blocks 64A–64D.

A shaft arm 66 is affixed to each end of main frame rock shaft 62. Each shaft arm 66 is pivotally connected to a linkage 68. Each linkage 68 is pivotally connected to wheel support 70 which extends forward and is in turn rotatably connected to the main frame 12. Each wheel support 70 is connected to the main frame 12 by means of wheel support shaft 72 rotatably received by a journalled bracket 74 affixed to the forward horizontal member 24 and a second journalled bracket 75 affixed to inner member 42. Wheels 14 are rotatably affixed to wheel support 70 by means of wheel axle 76.

Referring now to FIGS. 1 and 2, extension of hydraulic cylinder rod 54 rotates rock shaft 62 and shaft arm 66 in a counterclockwise direction exerting a downward force on linkage 68 and wheel support 70 to raise the main frame 12. Conversely, withdrawing hydraulic cylinder rod 54 into hydraulic cylinder 46 causes crank arm 60, main frame rock shaft 62 and shaft arm 66 to rotate in a clockwise direction exerting an upward force upon linkage 68 and wheel support 70 to lower the main frame 12.

Thus, the working depth of ground working tools such as chisel shanks 13A–13G carried upon horizontal members 34–38 of main frame 12 can be adjusted for varying tillage requirements. Preferably, the controls for actuating hydraulic cylinder 46 are located next to the operator's position on the vehicle to be used for towing the tillage implement 11 such that the working depth of the rear ground working tools 13A–13G can be adjusted while the tillage implement 11 is in motion.

Sub-frame 18 is coupled to the main frame 12 by means of a sub-frame lift mechanism 20 which allows the working depth of ground working tools carried upon the sub-frame 18, such as disks 19A–19G, to be adjusted for varying tillage requirements independently of the chisel shanks 13A–13G carried on the main frame 12. Turning now to FIG. 3, sub-frame 18 includes a forward horizontal member 80 and a rear horizontal member 82 joined at the ends by two outer braces 84 to form a rigid rectangular structure. Disks 19A–19G are affixed to the forward and rear horizontal members 80 and 82 by means of disk arms 86 which extend downwardly and rearwardly from the sub-frame 18, as best seen in FIGS. 1 and 2.

Returning now to FIG. 3, preferably disks 19A–19G are positioned along sub-frame members 80 and 82 in cooperating relationship to chisel shanks 13A–13G. Disks 19A–19G are positioned at horizontally spaced intervals to cut waste vegetation commonly referred to as trash, such as cornstalks. Chisel shanks 13A–13G are positioned in line with each respective disk 19A–19G to break up soil and bury the trash without plugging. The combination of disks 19A–19G and chisel shanks 13A–13G allows the present implement to perform two operations in a single pass over the field promoting the efficient use of man hours and conserving fuel.

Sub-frame lift mechanism 20 includes a sub-frame hydraulic cylinder 88 coupled to the main frame 12. A cylinder mounting bracket 90 projects downwardly from the main frame 12 having a tongue portion 92 for receiving clevis 94 of the hydraulic cylinder 88, which is also a double-acting unit (i.e. pressurized fluid is coupled to both the rod end and the butt or working end of the cylinder).

Hydraulic cylinder 88 has a hydraulic cylinder rod 96 having a clevis 98 for receiving the tongue portion 100 of a rock shaft crank arm 102. Sub-frame crank arm 102 is affixed to a rock shaft 104 which is rotatably affixed to the main frame 12. Main frame 12 includes two vertical frame extensions, one of which is designated 106 and seen in FIGS. 1 and 2. Each frame extension 106 extends above and below main frame members 30 and is journalled to receive rock shaft 104. Two shaft arms 108 are rigidly mounted to rock shaft 104 and pivotally mounted to sub-frame 18 at their distal ends. Sub-frame 18 includes two sub-frame lower projecting brackets 110 which extend forward from forward sub-frame member 80 for receiving respective ends of shaft arms 108.

Referring now to FIGS. 1 and 2, sub-frame 18 includes two vertical frame extensions 112 each having an upper bracket 113 which projects forward to a position in a substantially vertical plane with sub-frame lower backet 110 when sub-frame 18 is in a horizontal operating position.

Similarly, each main frame extension 106 projects upwardly from the rock shaft 104. Two links 114 are pivotally coupled at their forward ends to the vertical extensions 106 of the main frame with their pivot axes generally directly above the axis of rotation of rock shaft 104. Each link 114 is pivotally coupled to the sub-frame vertical extension 112 with its axis of rotation located generally above the pivotal connection between the shaft arms 108 and sub-frame 18. Thus, a four-bar linkage is formed with one pair of opposing parallel links formed by the vertical frame extensions 106 and 112 of the main frame and sub-frame respectively, and the other pair being formed by the shaft arms 108 and 114.

Referring to FIG. 2, extending the hydraulic cylinder 88 rotates crank arm 102, rock shaft 104 and shaft arms 108 clockwise thereby forcing the distal ends of shaft arms 108 to raise and lift sub-frame 18. Links 114 maintain sub-frame 18 in a substantially horizontal position as part of a four bar linkage motion.

Referring to FIG. 1, retracting hydraulic cylinder 88 rotates crank arm 102, rock shaft 104 and shaft arms 108 counterclockwise, forcing the distal ends of shaft arms 108 to lower sub-frame 18. Movement of the shaft arms 108 is mirrored by links 114 which stabilize the sub-frame 18 and maintains the sub-frame 18 in a substantially horizontal position.

Since cylinder 88 is double-acting, when it is set to a position and the valves are closed by the operator, the lift linkage becomes rigid. This enables the operator to shift some of the weight of the main frame to the tools on the sub-frame to provide down pressure on the tools carried by the sub-frame. That is, consider the sub-frame being lowered in the ground. Force is coupled from the sub-frame through rigid shaft arms 108. This force tends to raise (i.e. not just rotate) the rock shaft and is counteracted by the weight of the machine.

As illustrated in FIGS. 1 and 2, sub-frame 18 extends rearwardly behind the lift mechanism 20, such that upon engagement of the sub-frame ground working tools 19 with the ground, substantial cantilever forces are exerted upon links 114 and shaft arm 108. The cantilever forces cause wear in the pivots for coupling links 114 and shaft arms 108. Each link 114 is equipped with a turnbuckle 120 which allows the effective length of the link 114 to be adjusted to accommodate wear in the pivotal connections of the lift mechanism 20 and to allow compensation for manufacturing tolerances.

Persons skilled in the art will recognize that the respective positions of the links 114 and the shaft arms 108, rock shaft 104 and crank arm 102 are substantially interchangeable for some applications. Similarly, crank arm 102 may be positioned about rock shaft 104 in a number of positions which would allow the hydraulic cylinder to operate at its most effective leverage. As illustrated, crank arm 102 extends downwardly allowing the hydraulic cylinder 88 mounted in a downwardly rearwardly extending position from the main frame 12 to operate at about a 90 angle to the crank arm 102 providing effective leverage and providing the upper portion of implement 11 with a substantially uncluttered appearance when viewed from the top, as would a farmer viewing the implement from a tractor cab.

Rock shaft 104, shaft arm 108 and crank arm 102, coupled mechanically to hydraulic cylinder 88, not only allow the sub-frame 18 to be lifted, but allow the use of the hydraulic cylinder 88 to place a downward force on the sub-frame 18.

Preferably the controls for activating hydraulic cylinder 88 are located next to the operator's position on the vehicle to be used for towing the tillage implement 11 such that hydraulic cylinder 88 can be actuated by the operator as the implement is in motion. Further, it is preferable that the controls for actuating hydraulic cylinder 88 are located with the controls actuating hydraulic cylinder 46 on the main frame lift mechanism 16 such that the depth of the disks 19A–19G may be adjusted independently of the working depth of chisel plows 13A–13G.

In operation, the working depth of ground working tools 13A–13G carried upon the main frame 12 is adjusted by controlling the extension of hydraulic cylinder rod 54 of hydraulic cyliner 46 which controls the rotation orientation of crank arm 60, main frame rock shaft 62 and shaft arms 66 to exert upward or downward forces on linkages 68 and wheel supports 70. The working depth of the forward ground working tools 19A–19G mounted on sub-frame 18 is adjusted by controlling the extension of hydraulic cylinder rod 96 of hydraulic cylinder 88 which controls the rotational orientation of crank arm 102, rock shaft 104, and shaft arms 108. Sub-frame 18 pivotally affixed to shaft arm 108 is held in a substantially horizonal position by links 114 in a four bar linkage motion.

Thus, the present invention provides a simple, economical mechanism in which a plurality of ground working tools carried on a tillage implement can be separately adjusted as to working depth. The invention provides a sub-frame lift mechanism 20 utilizing only one rock shaft 104 and yet is capable of adjusting the sub-frame vertically over a wide angular displacement of the rock shaft while maintaining the sub-frame parallel to the main frame.

Having thus disclosed the preferred embodiments of the invention, persons skilled in the art will be able to modify certain of the structure which has been disclosed and to substitute equivalent elements for those described while continuing to practice the principles of the invention; and it is, therefore, intended that all such modifications and substitutions be covered as they are embraced within the spirit and scope of the appended claims.

I claim:

1. In a tillage apparatus adapted to be pulled by a vehicle, including a main frame adapted to carry a first set of ground working tools; wheel means coupled to said main frame for supporting and carrying said main frame; and first lift means coupled to said wheel means and main frame for raising and lowering said main frame, the improvement comprising: a sub-frame carried by said main frame at a location forward of said first set of tools; a second set of ground working tools mounted to said sub-frame, at least some tools of said second set being located forward of other tools of said second set; and a second lift means coupled to said main frame and said sub-frame for adjusting the height of said sub-frame, including a single rock shaft rotatably mounted to said main frame; power means coupled to said rock shaft for rotating it; and linkage means for mounting said sub-frame to said main frame and constructed and arranged to support said sub-frame while maintaining said sub-frame in horizontal disposition when said second set of tools are in working engagement with the soil, said linkage means comprising a first pair of generally parallel opposing links formed by a generally vertical frame extension of said main frame and said sub-frame respectively; and a second pair of generally parallel opposing links formed by a shaft arm rigidly attached to said rock shaft at one end and pivotally connected to said sub-frame at the other end, and a connecting link means pivotally mounted to said main frame vertical extension at one end and pivotally mounted to said sub-frame vertical extension at the other end.

2. The tillage apparatus of claim 1 wherein said rock shaft and said link means are rotatably mounted to said main frame extension with their respective rotation in a substantially vertical plane.

3. The tillage apparatus of claim 1 wherein said shaft arm and link means are rotatably mounted to said sub-frame extension with their respective rotational axes in a substantially vertical plane.

4. The apparatus of claim 2 wherein said main frame includes horizontal members extending substantially fore-and-aft, said main frame vertical extension extending above and below said main frame horizontal members, one of said axes of rotation of said rock shaft and said link means with said main frame positioned below said main frame horizontal member, and said other axis of rotation positioned above said main frame horizontal member.

5. The tillage apparatus of claim 1 wherein said power means includes a hydraulic cylinder and a crank arm, said hydraulic cylinder attached to said main frame at one end and to said crank arm at said opposite end, said crank arm affixed to said rock shaft to effect rotation of said rock shaft as said hydraulic cylinder is activated.

6. The tillage apparatus of claim 1 wherein said first lift means includes: a main frame rock shaft rotatably mounted to said main frame; main frame hydraulic power means for rotating said main frame rock shaft; at least one main frame shaft arm, affixed to said main frame rock shaft at one end for rotation therewith; main frame link means pivotally coupled at one main frame link means end to said main frame shaft arm end opposite said main frame rock shaft; main frame wheel support means having two ends, one of said ends pivotally coupled to said main frame, said opposite end pivotally coupled to said main frame link means end opposite said main frame shaft arm, said main frame wheel support rotatably coupled to said wheel means, said rotation of said main frame rock shaft and main frame shaft arm exerting forces on said main frame link means and main frame wheel support means to raise and lower said main frame to adjust the working depth of ground working tools carried upon said main frame.

7. The apparatus of claim 6 where said main frame power means includes a main frame hydraulic cylinder and a main frame crank arm, said main frame hydraulic cylinder attached to said main frame at one end and to said main frame crank arm at said opposite end, said main frame crank arm affixed to said main frame rock shaft to effect rotation of said main frame rock shaft as said main frame hydraulic cylinder is activated.

8. The apparatus of claim 1 wherein said link means further comprises a turnbuckle to allow compensation for wear.

9. The appartus of claim 1 wherein said sub-frame further includes transverse members joining said forward and rear members to form a rectangular shape in plan view, said forward and rear members parallel to each other and transverse of the direction of travel of said implement.

10. A tillage apparatus, adapted to be pulled by a vehicle, comprising: a main frame having horizontal members extending substantially fore-and-aft and a main frame extension, said main frame extension extending in generally vertical orientation above and below said main frame members, said main frame adapted to carry a first set of ground working tools; wheel means coupled to said main frame for supporting and carrying said main frame; first lift means coupled to said wheel means and main frame for raising and lowering said main frame; a sub-frame coupled to said main frame and adapted to carry a second set of ground working tools, said sub-frame having a sub-frame extension, said sub-frame extension extending in a generally vertical orientation; and a second lift means coupled to said main frame and said sub-frame to adjust the working depth of a second set of ground working tools carried on said sub-frame, said second lift means including: a single rock shaft rotatably mounted to said main frame extension below said main frame horizontal members; hydraulic power means for rotating said rock shaft; at least one shaft arm rigidly mounted to said rock shaft at one end for rotation therewith and pivotally coupled at the other end to said sub-frame, said sub-frame substantially cantilevered rearwardly of said shaft arm; and link means pivotally mounted to said main frame extension with an axis of rotation in a generally vertically spaced position relative to said rock shaft and pivotally mounted to said sub-frame extension at the other end with an axis of rotation in a generally vertically spaced position relative to the axis of rotation of said shaft arm about said sub-frame, said link means extending between said main frame and sub-frame substantially parallel to said shaft arm, said link means including a turnbuckle to allow compensation for wear in the second lift means, rotation of said rock shaft effecting movement of said shaft arm, to raise and lower said sub-frame, said link means maintaining said sub-frame in a horizontal orientation through a four bar linkage movement with said shaft arm to allow multiple sets of ground working tools to be adjusted as to working depth.

11. The tillage apparatus of claim 10 wherein said power means includes a double-acting hydraulic cylinder and a crank arm, said hydraulic cylinder attached to said main frame at one end and to said crank arm at said opposite end, said crank arm affixed to said rock shaft to rotate said rock shaft as said hydraulic cylinder is activated, whereby when said hydraulic cylinder is locked in position, at least some of the weight of said main frame can be transferred to said tools on said sub-frame in a controlled manner.

* * * * *